United States Patent [19]

Robinson

[11] 4,233,436
[45] Nov. 11, 1980

[54] BLOCK POLYMERS OF HYDROXYALKYL PHTHALATE ESTERS AND TETRAHYDROFURAN/ALKYLENE OXIDE COPOLYMERS

[75] Inventor: Ivan M. Robinson, Wilmington, Del.

[73] Assignee: E. I. Du Pont de Nemours and Company, Wilmington, Del.

[21] Appl. No.: 11,717

[22] Filed: Feb. 12, 1979

[51] Int. Cl.$^2$ .................... C08G 63/06; C08G 63/60; C08L 67/04
[52] U.S. Cl. ......................... 528/366; 525/169; 525/419; 525/440; 525/448; 528/274; 528/308; 528/309; 528/297
[58] Field of Search .................... 528/366, 297, 274; 525/169, 419

[56] References Cited

U.S. PATENT DOCUMENTS

| | | | |
|---|---|---|---|
| 3,483,169 | 12/1969 | Case et al. | 260/78.4 |
| 3,907,926 | 9/1975 | Brown et al. | 260/860 |
| 3,917,743 | 11/1975 | Schroeder et al. | 260/860 |
| 3,963,800 | 6/1976 | Gipp et al. | 260/860 |
| 4,081,494 | 3/1978 | Sakai et al. | 260/860 |

OTHER PUBLICATIONS

Noshay et al., Block Copolymers, Overview and Critical Survey, Academic Press, 1977, pp. 299-300.

Primary Examiner—Carman J. Seccuro

[57] ABSTRACT

Block polymers containing an hydroxyalkyl phthalate ester as one of the constituent blocks and a copolymer of tetrahydrofuran and one or more alkylene oxides as one or more of the other constituent blocks are useful in preparing polyurethanes and polyesters.

14 Claims, No Drawings

BLOCK POLYMERS OF HYDROXYALKYL PHTHALATE ESTERS AND TETRAHYDROFURAN/ALKYLENE OXIDE COPOLYMERS

DESCRIPTION

Technical Field

This invention relates to hydroxyl-terminated block copolymers. It is more particularly directed to block polymers containing (a) as one or more of their constituent blocks, a copolymer of tetrahydrofuran (THF) and one or more alkylene oxides and (b) as the other constituent block, a hydroxyalkyl phthalate ester.

The invention also relates to polyurethanes prepared using the block polymers.

Copolymers of THF and alkylene oxides are known and are used as starting materials in the preparation of polyurethanes. Polyurethanes based on such copolymers, and on customary isocyanates and chain-extenders, can be made in a wide range of stiffnesses by properly selecting the copolymer, isocyanate and chain-extender, and the proportions used. There is, however, a limit to the stiffness which can be obtained in this way, and therein lies a disadvantage, for while polyurethanes of this type are desirable for their other properties, for some uses stiffnesses of a higher order are needed. This is especially true of polyurethanes used in automobiles.

A need therefore exists for polyurethanes having the attributes of those made with THF/alkylene oxide copolymers, but with improved stiffnesses. This need is filled by polyurethanes made using the block polymers of the invention.

Disclosure of the Invention

The block polymers of the invention are linear hydroxyl-terminated block polymers represented by the structure

A—B or

A—B—A wherein the A block is a copolymer of THF and one or more alkylene oxides,
and
the B block is represented by the structure

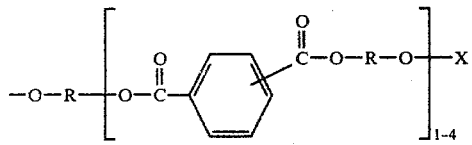

wherein
R is $-(CH_2)_{2-6}-$
or

where $R_1$ and $R_2$ can be the same or different and can be hydrogen or a linear or branched alkyl radical of 1-6 carbon atoms and X is hydrogen when the block polymer is in the A—B configuration, and absent when the block polymer is in the A—B—A configuration.

When the block polymer is in the A—B—A configuration, and the X moiety is not present, the A blocks, as represented above, are attached directly to the oxygen atoms.

The block polymers have number average molecular weights of 500-20,000, preferably 600-10,000. The A blocks constitute 30-99% of the weight of the total polymer, and the B blocks 1-70%.

Number average molecular weight is determined by first determining hydroxyl number according to ASTM-D-1638 and then converting this number to number average molecular weight according to the formula Molecular weight = 56,100×a/hydroxyl number where a is the hydroxyl functionality of the polymer.

In the definition of the A block, "copolymer" means a block which arises from polymerization of two, three or four monomeric components. "Alkylene oxide" means any alkylene oxide containing two or three carbon atoms in its oxide ring. It can be unsubstituted or substituted with, for example, alkyl or aryl groups, or with halogen atoms. Illustrative of such alkylene oxides are ethylene oxide; 1,2-propylene oxide; 1,3-propylene oxide; 1,2-butylene oxide; 1,3-butylene oxide; 3,3-bis-chloromethyl-1,3-propylene oxide; styrene oxide and epichlorohydrin.

Preferred block polymers are those in which the B block is represented by the structure

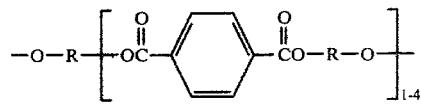

where R is as defined before.

Especially preferred in this group are those block polymers whose B blocks are represented by the structure

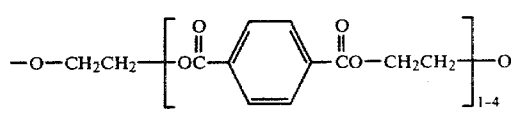

Also preferred are those block polymers of the invention having A blocks which are copolymers of THF and ethylene oxide, THF and a propylene oxide, preferably 1,2-propylene oxide, or terpolymers of THF, ethylene oxide and a propylene oxide.

Also preferred for their physical properties are those block polymers whose A blocks have THF/alkylene oxide weight ratios of 10/90-90/10, preferably 30/70-70/30.

In the preferred block polymers, the A blocks constitute 40-95%, by weight, of the total polymer, and the B blocks 5-60%.

The most preferred block polymers of the invention are those which have number average molecular weights of 600-5,000, whose A blocks are copolymers of THF and ethylene oxide in which the THF/ethylene oxide weight ratio is 40/60-70/30 and which constitute 50-95%, by weight of the total polymer, and whose B blocks are represented by the structure

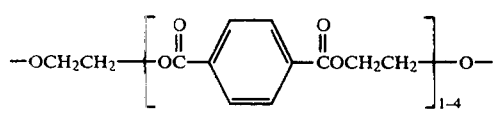

and constitute 5-50%, by weight of the total polymer.

The block polymers of the invention are made by catalytically and cationically copolymerizing THF and the desired alkylene oxide or oxides in the presence of BHET or one of its appropriate homologs, isomers, dimers, trimers or tetramers, or mixtures thereof.

Monomeric BHET can be made by the reaction of terephthalic acid and ethylene oxide. Oligomers, isomers and homologs of BHET can be made by ester interchange of appropriate phthalate esters with appropriate glycols of 2-6 carbon atoms, as is well known in the art.

The THF and the alkylene oxides used can be any of those commercially available.

The catalyst used in preparing the block polymers of the invention can be any proton-donating cationic polymerization catalyst. Illustrative are boron trifluoride, boron trifluoride etherate, acid-activated montmorillonite clays such as that sold by Süd-Chemie of Munich, Germany, as Catalyst K-10, and strongly acidic cationic ion-exchange resins.

Strongly acidic cationic ion-exchange resins are preferred for their activity and the ease with which they can be removed from the reaction mass. Preferred among such resins are those which are homopolymers of ethylenically unsaturated monomers, (a), containing groups such that the final catalyst polymer will contain groups of the formula

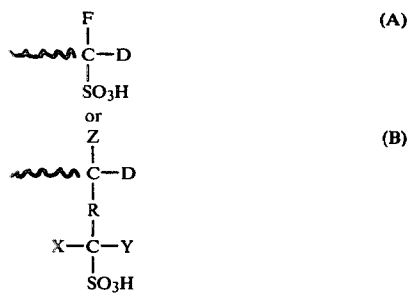

where
∿∿ represents the catalyst polymer chain or a segment thereof;
D is hydrogen, an aliphatic or aromatic hydrocarbon radical of 1-10 carbon atoms, a halogen atom or a segment of the catalyst polymer chain;
X and Y are hydrogen, halogen, an aliphatic or aromatic hydrocarbon radical of 1-10 carbon atoms, but at least one must be fluorine;
R is a linear or branched linking group having up to 40 carbon atoms in the principal chain, and
Z is hydrogen, halogen or an aliphatic or aromatic hydrocarbon radical of 1-10 carbon atoms,
or copolymers of any of the monomers in (a) with at least one other copolymerizable ethylenically unsaturated monomer (b).

The linking group defined by R in formula (B) can be a homogeneous one such as an alkylene radical, or it can be a heterogeneous one such as an alkylene ether radical. In the preferred catalyst polymers, this linking radical contains 1-20 carbon atoms in the principal chain. In the especially preferred catalyst polymers, R is a radical of the structure

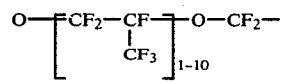

Illustrative of monomer (a) are such monomers are trifluorovinyl sulfonic acid, linear or branched chain vinyl monomers containing sulfonic acid group precursors and perfluoroalkylvinyl ethers containing sulfonic acid group precursors.

Illustrative of monomer (b) are such monomers as ethylene, styrene, vinyl chloride, vinyl fluoride, vinylidene fluoride, chlorotrifluoroethylene (CTFE), bromitrifluoroethylene (BTFE), vinyl ethers, perfluoroalkyl vinyl ethers, butadiene, tetrafluoroethylene (TFE) and hexafluoropropylene (HFP).

Homopolymerization and copolymerization to prepare the catalyst polymers can be done according to the procedures described in U.S. Pat. No. 3,784,399 to Grot, and the patents cited therein. Monomer ratios are selected to give the resulting catalyst polymers the proper equivalent weights.

The catalyst polymers have equivalent weights of 950-1,500, preferably 1,100-1,300. Equivalent weight of a catalyst polymer is that weight in grams which contains one gram equivalent weight of sulfonic acid groups, and can be determined by titration.

The catalyst polymers should be effectively free of functional groups, other than —SO₃H groups, which might interfere with the principal polymerization reaction. "Effectively free" means the catalyst polymers may contain a small number of such groups, but not so many that the reaction is affected adversely or the product contaminated. Illustrative of such groups are carboxyl groups, hydroxyl groups and amino groups.

Catalyst polymers whose polymer chains are of perfluorocarbon monomers are most preferred for use. Illustrative of such monomers are TFE, HFP, CTFE, BTFE and perfluoroalkyl vinyl ethers. Mixtures of monomers can also be used.

Even more preferred as catalyst polymers are copolymers of TFE and CTFE and a perfluoroalkyl vinyl ether containing sulfonic acid group precursors. Most preferred in this case are copolymers of TFE or CTFE and a monomer represented by the structure

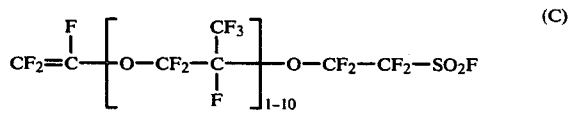

These catalyst copolymers are prepared in the sulfonyl fluoride form and are then hydrolyzed to the acid form as described in U.S. Pat. No. 3,692,569.

Most preferred as catalyst polymers are copolymers of TFE and monomers of formula (C) in which the respective monomer unit weight ratios are 25/75-50/50. Such copolymers having equivalent weights of 1,100, 1,197, 1,500 and 1,900 are sold by E. I. du Pont de Nemours and Company as Nafion ® perfluorosulfonic acid resin.

The process of preparing the block polymers of the invention can be carried out in the batch mode or in continuous fashion. The batch method favors production of block polymers having the A—B—A configuration, while the continuous method favors production of block polymers having the A—B configuration.

In either method, the BHET (or isomer, homolog, dimer, trimer, tetramer or mixture thereof) is present in the reaction mass at a concentration of 1-35%, preferably 3-25%, by weight of the total mass. THF is present at a concentration of 25-94%, preferably 65-80%, and the alkylene oxide is present at a concentration of 5-50%, preferably 15-30%. A concentration of BHET (or isomer, etc.) in the high portion of its range favors production of block polymers having the A—B configuration; a concentration in the low portion of the range favors the A—B—A configuration.

The weight percent concentration of the A and B blocks in the final polymer is governed by the amount of BHET (or isomer, etc.) used in its preparation. A small amount, i.e., in the range of about 1% of the reaction mass, will give a block polymer whose B block constitutes about 2% by weight of the polymer and whose A blocks constitute about 98%. Conversely, a larger amount, i.e., in the range of about 25% of the reaction mass, will give a block polymer whose B block constitutes about 40% by weight of the polymer and whose A blocks constitute about 60%.

The THF/alkylene oxide monomer unit weight ratio in the A block is governed by the ratio of THF to alkylene oxide in the reaction mass, adjusted by the degree of conversion expected.

A block polymer having a number average molecular weight within any desired range can be prepared by properly adjusting reaction temperature, catalyst concentration and feed composition according to well-known principles of polymer chemistry.

To prepare a block polymer of the invention by the batch method, a suitable amount of BHET (or isomer, etc. thereof) is charged to a reaction and to this is then added the catalyst. In the case of boron trifluoride or boron trifluoride etherate, the amount used is 0.01-1% by weight of the total reactant feed used; in the case of clays or ion-exchange resins, the amount used is 0.5-60%, by weight of the total reactant feed used.

To the resulting mass are then slowly added, with stirring, over a period of 2-8 hours, the proper amounts of THF and alkylene oxide. The THF and alkylene oxide can be added separately or in admixture, and the temperature of the reaction mass is maintained at about 35°-80° C., preferably 50°-70° C., during the addition.

When addition of the THF and alkylene oxide is finished, the catalyst is separated from the reaction mass by filtration or decantation and residual THF and volatile byproducts are removed from the reaction mass by vacuum stripping or other suitable means. If $BF_3$ or its etherate is used as the catalyst, it should be first neutralized by a conventional procedure such as treatment with a basic ion-exchange resin. Preparation of the block polymer is then complete.

In the continuous method for preparing the block polymers, suitable amounts of THF, alkylene oxide and BHET (or isomer, etc.) are mixed and continuously fed into a reactor containing an appropriate amount of catalyst, while the block polymer product, in solution, is continuously withdrawn. The rates of feed and withdrawal are balanced so that a residence time of the reaction mass in the reactor of 50-360 minutes is maintained. If the catalyst in particulate, it is held in the reactor by suitable screens or filters. As with the product made by the batch process, residual THF and volatile byproducts are removed from the product by vacuum stripping or other suitable means, and preparation of the block polymer is then complete.

The products of the invention thus prepared are polymerizates containing polymers of the A—B—A type and polymers of the A—B type. As already described, polymerizates containing more of one type than the other can be prepared by varying the methods of preparation. All such polymerizates are useful for preparing the polyurethanes of the invention, and separation of the component block polymers from each other is not necessary. The polymerizates can be used directly, and their use frequently confers benefits when polyurethanes having blends of properties are desired. If it is essential that the block polymers be separated from each other, the separation can be made by well-known fractional extraction techniques.

The polyurethanes of the invention are reaction products of (1) a block polymer of the type just described, (2) an organic polyisocyanate and (3) an aliphatic polyol or polyamine chain extender.

The polyisocyanates used in preparing the polyurethanes of the invention can be any of the aliphatic or aromatic polyisocyanates ordinarily used to prepare polyurethanes. Illustrative are 2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
dicyclohexylmethane-4,4'-diisocyanate
1,4-benzene diisocyanate
3,3'-dimethoxy-4,4'-biphenyl diisocyanate
m-phenylene diisocyanate
isophorone diisocyanate
polymethylene polyphenyl isocyanate
4,4'-biphenylene diisocyanate
4-isocyanatocyclohexyl-4'-isocyanatophenyl methane
p-isocyanatomethyl phenyl isocyanate.

Mixtures of isocyanates can also be used.

The isocyanates preferred for use because of their low cost and the desirable properties they confer on the polyurethane products are diphenylmethane-4,4'-diisocyanate and the toluene diisocyanates.

The chain extenders used in preparing the polyurethanes of the invention can be any of the aliphatic polyols, or any of the aliphatic or aromatic polyamines ordinarily used to prepare polyurethanes.

Illustrative of the aliphatic polyols which can be used as chain extenders are diethylene glycol
1,4-butanediol
ethylene glycol
1,6-hexanediol
glycerine
trimethylolpropane
pentaerythritol
1,4-cyclohexane dimethanol
phenyl diethanolamine.

Diols like hydroquinone bis(betahydroxyethyl) ether, tetrachlorohydroquinone-1,4-bis(betahydroxyethyl) ether and tetrachlorohydroquinone-1,4-bis(betahydroxyether) sulfide, even though they contain aromatic rings, are considered to be aliphatic polyols for purposes of the invention.

Aliphatic diols of 2-10 carbon atoms are preferred. Especially preferred are 1,4-butanediol and hydroquinone bis(β-hydroxyethyl)ether. Mixtures of diols can also be used.

Illustrative of the polyamines which can be used as chain extenders are p,p'-methylene dianiline and complexes thereof with alkali metal chlorides, bromides, iodides, nitrites and nitrates
4,4'-methylene bis(2-chloroaniline)
dichlorobenzidine
piperazine
2-methylpiperazine
oxydianiline
hydrazine
ethylenediamine
hexamethylenediamine
xylylenediamine
bis(p-aminocyclohexyl)methane
dimethyl ester of 4,4'-methylenedianthranilic acid
p-phenylenediamine
m-phenylenediamine
4,4'-methylene bis(2-methoxyaniline)
4,4'-methylene bis(N-methylaniline)
2,4-toluenediamine
2,6-toluenediamine
benzidine
3,3'-dimethylbenzidine
3,3'-dimethoxybenzidine
dianisidine
1,3-propanediol bis(p-aminobenzoate)
isophorone diamine.

The amines preferred for use are 4,4'-methylene bis(2-chloroaniline), 1,3-propanediol bis(p-aminobenzoate) and p,p'-methylenedianiline and complexes thereof with alkali metal chlorides, bromides, iodides, nitrites and nitrates. Mixtures of amines can also be used.

The polyurethanes of the invention are prepared in two steps, the first of which is conducted under nitrogen at ambient pressure to prevent oxidation of the reactants and product, and to prevent exposure of the reaction mass to atmospheric moisture. In the first step, the block polymer starting material is dried by heating it at a temperature of 80°-100° C. under vacuum, and is then heated to 60°-150° C., preferably about 70°-125° C., and held there while an excess over the stoichiometric amount, preferably twofold to tenfold, of organic diisocyanate is added, with stirring. The actual amount of isocyanate used depends on the molecular weight of the block polymer, as is well-known in the art. The reaction mass is held for about 1-4 hours at 60°-150° C., with stirring, and the free isocyanate content of the mass is then determined by titrating it with di-n-butylamine, as described in Analytical Chemistry of the Polyurethanes, Volume XVI, Part III, D. J. David and H. B. Staley, Wiley-Interscience, 1969, pages 357-359.

In the second step, an amount of polyamine or polyol chain extender calculated to give an isocyanate/hydroxyl or amine mole ratio of about 0.9-1.1 to 1 in the reaction mass, preferably 1.05/1, is degassed at about 30°-150° C. and a pressure of 1,333-6,700 Pa. and quickly added to the reaction mass.

The reaction mass is held with stirring at 60°-130° C. until it is homogeneous, which normally takes 1-5 minutes. The mass is then poured into molds, preferably preheated to 100°-150° C., and then cured at about 100°-150° C., at a pressure of 120,000-140,000 kilopascals for from 5 minutes to several hours. The casting is then cooled, removed from the mold, aged for about one week at ambient temperature, and is then ready for use.

The polyurethanes of this invention can also be made by reaction-injection and liquid-injection molding techniques, whereby the starting materials are simultaneously injected and mixed in a mold, preferably together with such a conventional polyurethane catalyst as dibutyltin dilaurate or stannous octoate, and then subjected to pressures ranging from ambient to several thousand kilopascals and temperatures ranging from ambient to 150° C. Use of a foaming agent such as a fluorocarbon or water is optional.

EXAMPLES

In the following examples, all parts are by weight unless otherwise indicated.

EXAMPLE 1—Best Mode 18.0 Parts of BHET and 29.8 parts of Nafion ® perfluorosulfonic acid resin (equivalent weight 1,197), swollen and wet with THF, were charged to a reactor. To the resulting mass was slowly added, with stirring, over a seven-hour period, a mixture of 250 parts of THF and 80 parts of ethylene oxide. During the addition, the temperature of the reaction mass was held at about 55°-60° C.

When the feed was finished, the catalyst was allowed to settle and the reaction mass was decanted. Unreacted THF and volatile byproducts were then removed from the reaction mass by first treating it in a steam-heated rotary evaporator at a pressure of about 27.7 kilopascals and then holding it under a vacuum of 666-1,333 pascals at 90° C. for about 2 hours, to give a mixture principally containing a block polymer of the A—B—A configuration in which the B block was represented by the structure

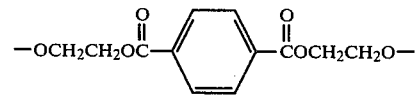

and the A block was a copolymer of THF and ethylene oxide. The block polymer had the following characteristics:

(1) Number average molecular weight—1,814
(2) THF/ethylene oxide weight ratio in the A block—56/44
(3) Percent of total block polymer weight-A blocks—88%
(4) Percent of total block polymer weight-B block—12%

EXAMPLE 2

The product of Example 1, 73.8 parts, was heated to and held at 80° C. for 30 minutes under a pressure of 1,300-2,000 Pa. (10-15 mm Hg). Heating was then stopped and 37.6 parts of liquid diphenylmethane-4,4'-diisocyanate were added, with stirring, under a nitrogen atmosphere. The temperature of the mixture was then brought back to 80° C. and held there for 2 hours, with stirring.

104.4 Parts of the resulting prepolymer were held at 80° C. for 1 hour under a vacuum of 1,333 Pa. and to it were then added 8.78 parts of 1,4-butanediol, preheated to 80° C. The resulting mixture was stirred for three minutes at 80° C. and then poured into molds preheated to 110° C., which were then pressed in a platen press at 110° C. and a pressure of 137,895 kilopascals for 17 hours.

After aging for one week, the resulting polyurethane had the following physical properties:

| Modulus - Kilopascals | |
|---|---|
| 100% Elongation | 300% Elongation |
| 7136 (1,035 psi) | 12,445 (1,805 psi) |
| Tensile Strength at Break - kg/cm² | 26,752 (3,880 psi) |
| Tear - kilograms per - centimeter - | 10.36 (58 lbs/lineal inch) |
| Elongation at Break - Percent | 535% |
| Hardness - Shore A | 87 |
| Compression Set - Percent | 13 |
| Bashore Rebound - Percent | 56 |
| Clash - Berg °C. | |
| $T_4$ | −37 |
| $T_f$ | −71 |

EXAMPLE 3

90 Parts of a mixture of oligomers of BHET (molecular weight 312) were partially dissolved in 400 parts of dioxane. One part of $BF_3$ etherate was added and the reaction mass heated to 55° C., with stirring, and held at that temperature while a feed composition of 144 parts THF and 56 parts ethylene oxide was slowly added over a period of 130 minutes. Twenty parts of THF were then added and the reaction mass brought to reflux temperature and filtered hot to remove 37 parts of solid. The hot filtrate was neutralized with about 100 parts of a base ion-exchange resin and filtered again. The filtrate was treated in a steam heated rotary evaporator at a pressure of 27.7 kilopascals to remove THF, dioxane and volatiles, leaving 148.5 parts of solid product.

The block polymer thus produced had the following physical characteristics:

| $MW_n$ | 894 |
|---|---|
| THF/EO weight ratio in A block | 40–60 |
| weight percent of A block | 65% |
| weight percent of B block | 35% |

INDUSTRIAL APPLICABILITY

The block polymers of the invention can be used in place of conventional polyether or polyester glycols to prepare polyurethanes having enhanced high temperature stiffness, which suits them for use in automobiles.

The block polymers can also be used to prepare polyesters according to well-known methods in which polyols are reacted with dibasic acids or their esters.

I claim:

1. A linear hydroxyl-terminated block polymer represented by the structure

A—B or

A—B—A wherein the A block is a copolymer of THF and one or more alkylene oxides, containing two or three carbon atoms in its oxide ring which block constitutes 30–99% of the weight of the total polymer, and the B block is represented by the structure

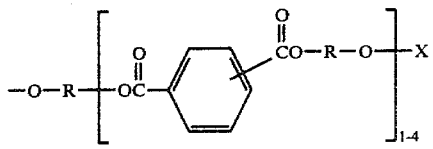

wherein
R is $-(CH_2)_{2-6}$

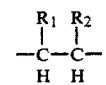

where $R_1$ and $R_2$ can be the same or different and can be hydrogen or a linear or branched alkyl radical of 1–6 carbon atoms and X is hydrogen when the block polymer is in the A—B configuration, and absent when the block polymer is in the A—B—A configuration, which block constitutes 1–70% of the weight of the total polymer, the polymer having a number average molecular weight of 500–20,000.

2. The block polymer of claim 1 wherein the B block is represented by the structure

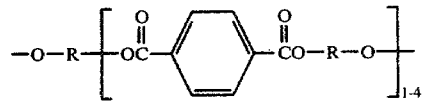

3. The block polymer of claim 1 having a number average molecular weight of 600–10,000.

4. The block polymer of claim 1 wherein the alkylene oxide in the A block is ethylene oxide.

5. The block polymer of claim 1 wherein the alkylene oxide in the A block is a propylene oxide.

6. The block polymer of claim 1 wherein the A block has a THF/alkylene oxide weight ratio of 10/90–90/10.

7. The block polymer of claim 1 wherein the THF/alkylene oxide weight ratio is 30/70–70/30.

8. The block polymer of claim 1 wherein the A block constitutes 50–95% of the total weight of the polymer and the B block constitutes 5–50% of the total weight of the polymer.

9. The block polymer of claim 4 wherein the A block has a THF/ethylene oxide weight ratio of 40/60–70/30 and constitutes 50–95% of the weight of the total polymer, and the B block is represented by the structure

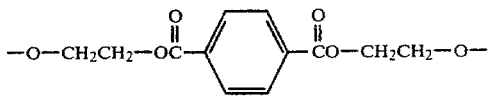

and constitutes 5–50% of the weight of the total polymer, the block polymer having a number average molecular weight of 600–5,000.

10. A process fr catalytically preparing the block polymer of claim 1, the process comprising bringing together, under conditions suitable for reaction, (a) a compound represented by the structure

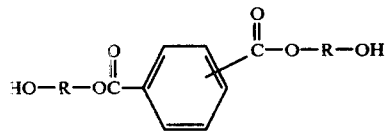

(b) tetrahydrofuran,
(c) one or more alkylene oxides, and
(d) a cationic proton-donating polymerization catalyst.

11. The process of claim 10 wherein the catalyst is a homopolymer of an ethylenically unsaturated monomer (a) containing groups such that the final catalyst polymer will contain groups of the formula

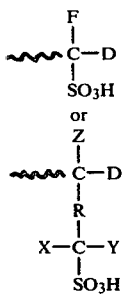

where

∿∿∿ represents the catalyst polymer chain or a segment thereof;

D is hydrogen, an aliphatic or aromatic hydrocarbon radical of 1–10 carbon atoms, a halogen or a segment of the catalyst polymer chain;

X and Y are hydrogen, halogen or an aliphatic or aromatic hydrocarbon radical of 1–10 carbon atoms, but at least one of X or Y must be fluorine;

R is a linear or branched linking group having up to 40 carbon atoms in the principal chain; and Z is hydrogen, a halogen or an aliphatic or aromatic hydrocarbon radical of 1–10 carbon atoms;

or a copolymer of monomer (a) with at least one other copolymerizable ethylenically unsaturated monomer (b), the homopolymer or copolymer being effectively free of functional groups which interfere with the reaction.

12. The process of claim 11 in which the catalyst is a copolymer of monomer (a) and a perfluorocarbon monomer.

13. The process of claim 12 in which the catalyst is a copolymer of TFE or CTFE and a monomer represented by the structure

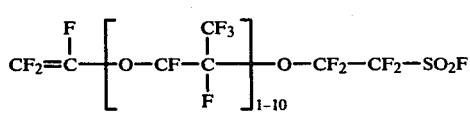

the TFE or CTFE and monomer units being present in weight ratios of 25–75/50–50, respectively, the catalyst copolymer being hydrolyzed to the acid form.

14. A polymerizate containing block polymers represented by the structure A—B—A and block polymers represented by the structure A—B, both as defined in claim 1.

* * * * *